(No Model.) 5 Sheets—Sheet 1.

F. H. RICHARDS.
WEIGHING MACHINE.

No. 600,037. Patented Mar. 1, 1898.

Witnesses:
C. W. Smith
Fred. J. Dole

Inventor:
F. H. Richards (No Model.) 5 Sheets—Sheet 2.

F. H. RICHARDS.
WEIGHING MACHINE.

No. 600,037. Patented Mar. 1, 1898.

Witnesses:
O. W. Smith
Fred. J. Dole

Inventor:
F. H. Richards (No Model.) 5 Sheets—Sheet 3.

F. H. RICHARDS.
WEIGHING MACHINE.

No. 600,037. Patented Mar. 1, 1898.

Witnesses:
O. W. Smith
Fred J. Dole

Inventor:
F. H. Richards (No Model.)  5 Sheets—Sheet 4.

F. H. RICHARDS.
WEIGHING MACHINE.

No. 600,037. Patented Mar. 1, 1898.

Witnesses:
C. W. Smith
Fred. J. Dole.

Inventor:
F. H. Richards (No Model.) 5 Sheets—Sheet 5.

F. H. RICHARDS.
WEIGHING MACHINE.

No. 600,037. Patented Mar. 1, 1898.

Witnesses;
O. W. Smith
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 600,037, dated March 1, 1898.

Application filed July 8, 1897. Serial No. 643,817. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing - machines; and the object thereof is to provide a machine of this character embodying improvements particularly adapted for application to machines of the type disclosed in Letters Patent No. 572,067, granted to me November 24, 1896; and it comprehends, essentially, electrically controlled or actuated means for insuring the sequential or regular operation of the supply and delivery parts, so that accurate loads of material in large quantities may be automatically obtained with facility and precision.

Figure 1:
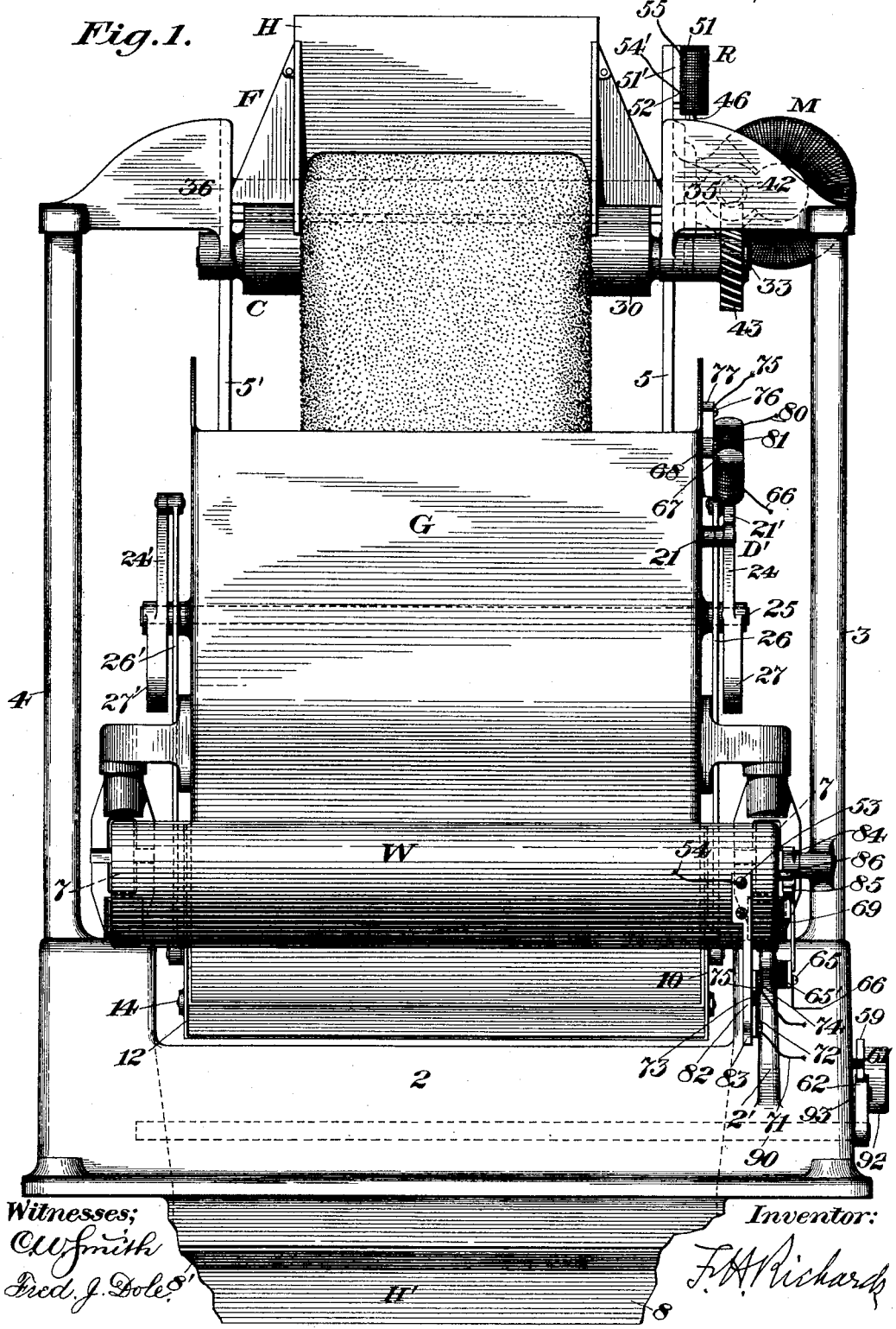
Figure 2:
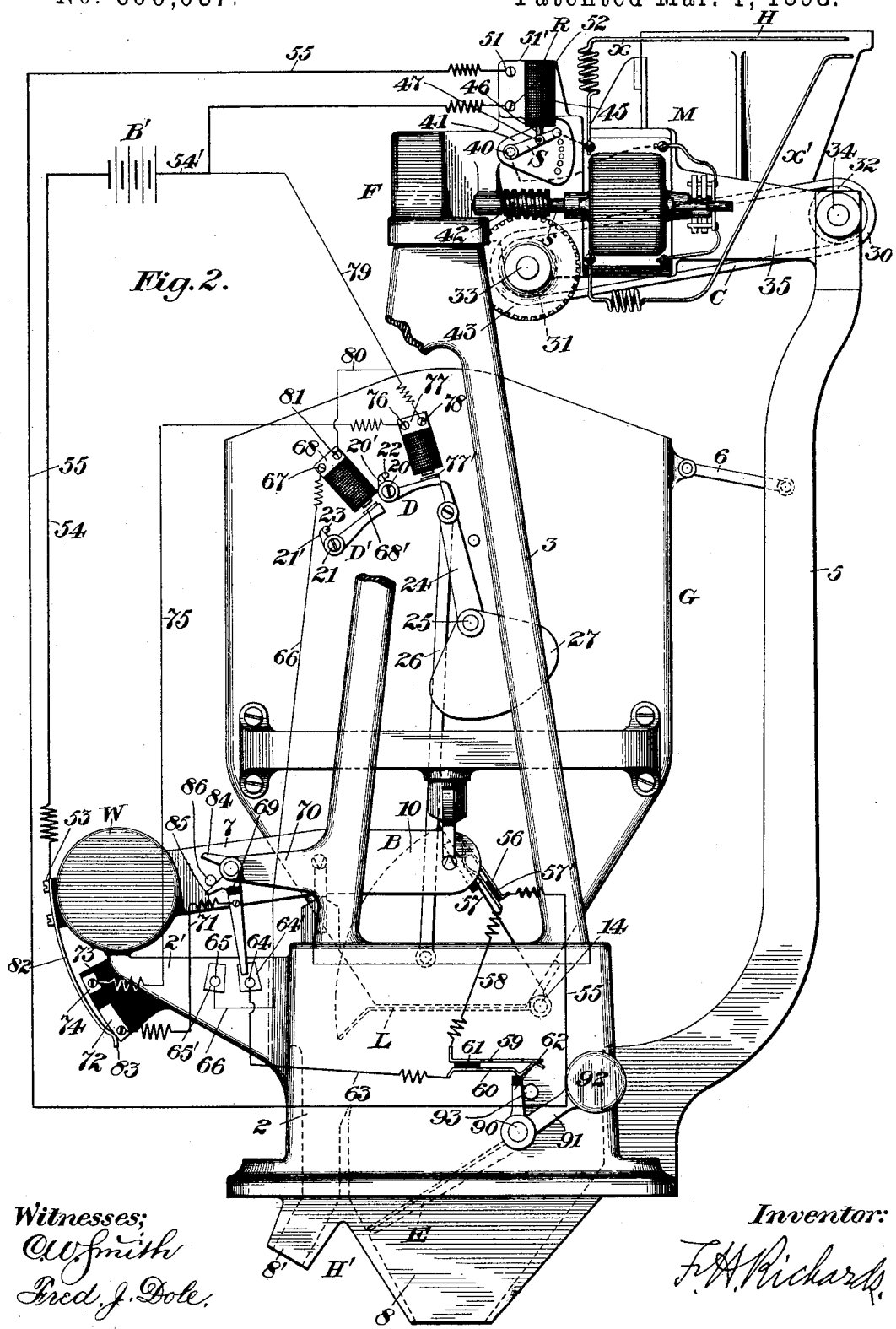
Figure 3:
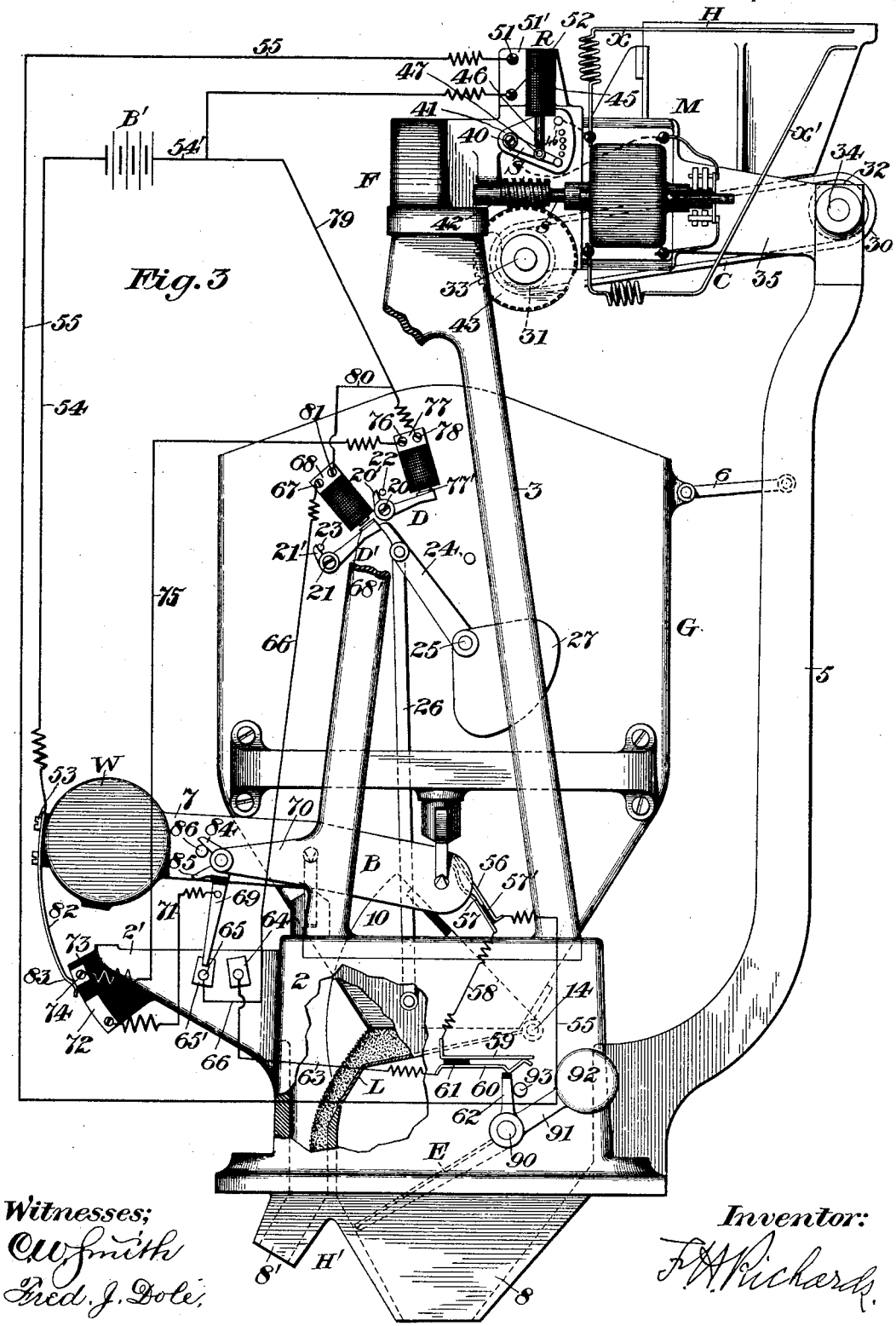
Figure 4:
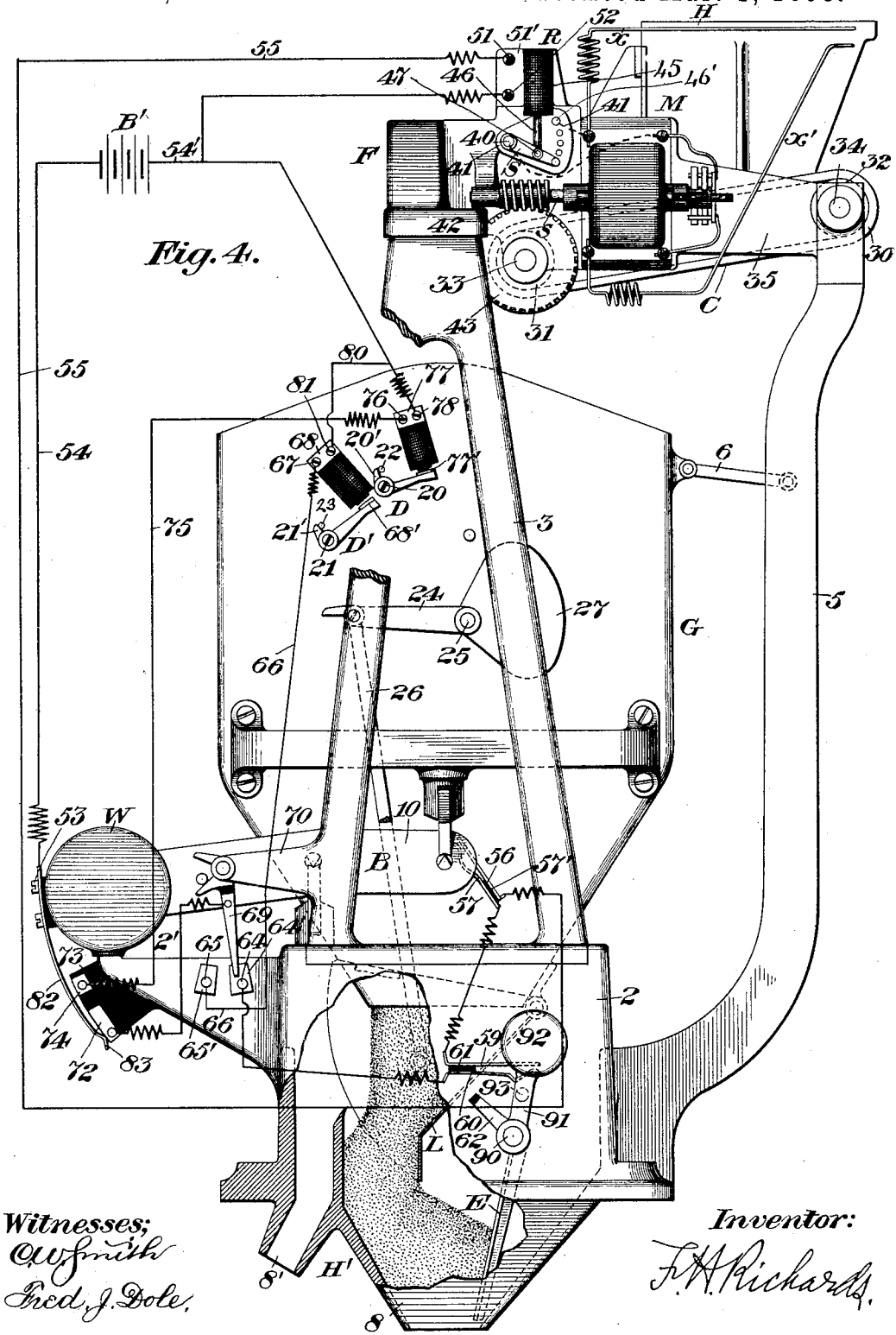

In the drawings accompanying and forming part of this specification, Figure 1 is a front elevation of a weighing-machine embodying my present improvements. Figs. 2, 3, and 4 are side elevations of the same as seen from the right in Fig. 1, showing the positions assumed by the several parts during the making and discharging of a load. Figs. 5, 6, 7, 8, and 9 are diagrammatic views illustrating the mode of operation in making and breaking the various electric circuits.

Similar characters designate like parts in all the figures of the drawings.

The framework for sustaining the various parts of the machine consists in the present case of the chambered base or bed 2, the side frames 3 and 4, the upright or standard 5, rising from the base 2, and the auxiliary frame F, mounted upon the side frames 3 and 4 and standards 5 and 5' and the auxiliary frame F, carrying the several parts of the supply mechanism, hereinafter more particularly described.

The weighing mechanism, as is usual, consists of a load-receiver, as G, and a supporting scale-beam, as B, said scale-beam being sustained upon the base 2 and supporting the load-receiver G at its poising end in the usual manner—for example, as illustrated in the patent hereinbefore mentioned.

For the purpose of preventing undue oscillation of the load-receiver during its rise and fall a guide-link 6, pivoted to said load-receiver near its upper end and to the standard 5, is provided.

The scale-beam B is of the ordinary kind, it consisting of a pair of longitudinal arms 7, joined by the counterweight W.

The load-receiver G has the usual discharge-outlet, through which the weighed loads can intermittingly pass into the main chamber 8 of the duplex discharge-hopper H', situated below and secured to the base 2.

The discharge-outlet of the load-receiver is normally covered by a closer or flap, as L, consisting of a plate provided with the segmental guard-walls 10 and 12 at its opposite sides, located to lap over the lower side walls of the load-receiver. The closer L is also pivoted for oscillation to the load-receiver, as at 14.

The weighing mechanism includes a load-discharger, and the closer L, in the type of weighing mechanism illustrated in the drawings, constitutes such a load-discharger, and it is mounted to have successive movements in the same direction, first for discharging the surplus and then for discharging the predetermined load, it being understood that, as in the patent hereinbefore mentioned, an overload is supplied to the load-receiver G prior to the opening or release of the closer. The overload consists of the predetermined charge or load and an added quantity of material in excess of or beyond the said charge, the whole being delivered into the load-receiver and the surplus being removed, as thus stated, by the shifting of the closer. The closer is so mounted as to be opened in several successive stages by the pressure of material in the load-receiver acting against the same, and a plurality of detents, such as latches, are employed to hold the closer in its several shifted positions.

A latch is provided to hold the closer in its shut or normal position, as represented in Fig. 2, until an overload is supplied to the load-receiver, at which time said latch is tripped, permitting the closer to open partially, as represented in Fig. 3, in which position it is held by a second latch to permit the surplus to pass from the load-receiver G and enter the auxiliary or smaller chamber 8' of the duplex hopper H'. At a further stage in the operation of the machine the second latch is tripped, permitting the closer to be opened from its primary position to its secondary shifted or wide-open position, as represented in Fig. 4, so that the completed or true load can pass from the load-receiver into the main chamber 8 of the hopper H'.

The closer-holding detents or latches are designated, respectively, by D and D', they being successively tripped at predetermined points in the operation of the machine. The two detents are gravity-detents and they are pivoted, as at 20 and 21, to the load-receiver, each being provided with a toe, as 20' and 21', adapted normally to bear against the stops or pins 22 and 23, respectively, on the load-receiver. The latches are adapted successively to engage a suitable device coöperative with the closer, as the lever 24, pivoted, as at 25, to the load-receiver G. The lever 24, at a point between its center of movement and the working end thereof, has pivoted thereto the link 26, likewise connected to the guard-wall 10, forming a part of the closer L. The pivot 25 of the lever 24 consists of a rock-shaft passing through the load-receiver, and it has at its opposite end a second lever 24', to which is pivoted the link 26', disposed in parallelism with the link 26, pivoted at its lower end to the closer-guard wall 12. The lower arms 27 and 27' of the levers 24 and 24', respectively, consist of counter-weights of suitable efficiency operative to return the closer to its shut position on the discharge of the true load—that is, the mass remaining in the load-receiver after the removal of the surplus.

The means for overloading the load-receiver G consists in the present case of a conveyer C in the form of an endless belt 30, passed around the supporting-rolls 31 and 32, whose shafts 33 and 34 are journaled in the L-shaped brackets 35 and 36, respectively, mounted on and secured to the side frame 3 and standard 5 and side frame 4 and standard 5'. A hopper is shown at H, mounted over and secured to the brackets 35 and 36, respectively, said hopper being supplied with a mass of material which is delivered by the conveyer C into the load-receiver G to overload the same.

The conveyer C in the present instance is driven by an electric motor M, which, being of well-known construction, is unnecessary specifically to describe. The wire X is connected with a rheostat or resistance device R of ordinary construction upon which is mounted the switch S, consisting of a lever pivoted at 40 on the rheostat-plate 41, the latter being secured to the bracket 35, and the contacts of the rheostat being connected in turn with one side of the motor, the conductor or wire X' being connected to the other side of said motor. The motor-shaft s is furnished with a worm 42, meshing with a worm-gear 43 on the front shaft 33 of the conveyer C, so that when a current is supplied to the motor it, and consequently the conveyer C, will be operated, the conveyer being adapted to supply an overload to the load-receiver which it conducts from the supply-hopper H.

In connection with the motor a motor-controlling device in a circuit independent of the motor is provided, said independent circuit being broken when the load-receiver is overcharged, so that the action of the motor may be governed to stop the supply to said load-receiver. The motor-controlling device consists in the present case of a solenoid-magnet 45 of common construction, mounted upon the bracket 35, and the core 46 of which is pivoted, as at 47, to the switch-lever S. When the solenoid 45 is energized, the core 46 will be drawn in to hold the switch-lever S in contact with the upper contact-point of the series on the rheostat, so that the full strength of the current will pass through the motor. When the solenoid 45 is deënergized by the breaking of its circuit on the overloading of the load-receiver G, the solenoid-core 46, and consequently the switch-lever S, will drop to cut out the motor, so as to stop the supply-conveyer C. The breaking of the solenoid-circuit is effected, preferably, by the weighing mechanism or the beam B.

My present invention comprehends the provision of electrical means for controlling the motor for effecting the removal of the surplus from the load-receiver and for discharging the completed load, which, as is understood, is the mass remaining in the load-receiver after the removal of the surplus, and I will now describe the disposition of the several conductors or wires represented for conveniently effecting the results specified.

The solenoid base or plate 51' has the posts 51 and 52, the post 52 being connected with a similar post 53 on the beam-weight W by the conductor 54', battery B', and the wire 54. The post 51 is connected by the wire 55 with a terminal 56 on the load-receiver. The terminal 56 consists of a metallic strip with which the spring-terminal 57 coöperates, these two terminals being mechanically secured to and electrically insulated from each other by a rubber or other strip 57' on the load-receiver. The spring-terminal 57, which is normally held in contact with the coöperating terminal 56 by the closer-wall 10, as shown in Fig. 2, is connected by the wire 58 with the terminal 59, which coöperates with a spring-terminal 60, these two parts being insulated from each other by the hard-rubber strip 61, secured to the outside face of the base 2.

The terminal 60 consists of a spring circuit-controller held in contact with the coöperating terminal 59 by the arm 62 of the regulator E, hereinafter more particularly described. The wire 63 leads from the circuit controller or terminal 60 to the post 64, mounted on and insulated from the base 2. A similar post is shown at 65, it being connected by the wire 66 with the post 67 on the magnet 68, mounted near the upper end of the load-receiver.

An insulated oscillatory circuit-controller or switch is shown at 69, pivoted to the arm 70, extending forward from the side frame 3, the lower end of said circuit-controller being adapted successively to make contact with contact-pieces or terminals 64' and 65', on which the posts 64 and 65, respectively, are secured. The circuit-controller 69 is connected by the wire 71 with the terminal or contact-piece 72 on the plate 73, of insulating material, secured to the support 2', said plate being furnished with a second contact-piece 74, with which the wire 75 is connected, the opposite end of the wire being attached to the post 76 of the magnet 77. The post 78 of the magnet 77 is connected by the wire 79 to the wire 54'. The wire 80 runs from the wire 79 to the post 81 of the magnet 68. A circuit-controller or circuit making and breaking device in the form of a longitudinal spring 82, secured to and insulated from the weight W in some convenient manner, is provided, its working end being slightly bent, as at 83, and adapted successively to contact with the contact-pieces or terminals 72 and 74, respectively. The circuit-controller 69 is bifurcated at its upper end, the branches or arms of the bifurcation being designated by 84 and 85, and the actuator 86 on the beam-arm 7 being adapted to coöperate with said controller.

The regulator E, to which I have hereinbefore referred, is oscillatory below the load-receiver, it being intermittingly shifted by the discharging loads delivered by said receiver. The regulator is secured to the transverse rock-shaft 90, the opposite ends of which are journaled in the end walls of the base 2, the arm 62, to which I have hereinbefore referred, being secured to the outer end of said shaft. The regulator E consists of a flat plate having a rearwardly-extending arm 91, furnished with a regulator-shifting device or counterweight 92, adapted to hold the arm 62 against the stop 93 on the base and to return said regulator to its primary position when the mass of material discharged thereagainst has passed below its discharge edge. The arm 62, when the regulator is in its primary position, (represented in Fig. 2,) is adapted to hold the spring-terminal 60 in contact with the terminal 59, and the closer L being shut the wall 10 will hold the spring-terminal 57 against the terminal 56, as also illustrated in said figure, both the arm 62 and the wall 10 having insulating material where they engage these terminals.

The wires 54 and 54' are connected with a source of electrical energy, such as a primary battery B' of ordinary construction.

At the commencement of operation, as illustrated in Fig. 2, the closer L is shut and held in such position by the latch D engaging the lever 24, and the regulator E is in its primary position and is held by the weight 92, the arm 62 being against the stop 93. The closer L and regulator E being in their primary positions the closer-guard wall 10 will hold the terminals 57 and 56 in contact and the regulator-arm 62 will maintain the terminal 60 and 59 in contact. At this time the controller 69 will be on the contact-piece 64' and the controller 82 will be against the contact-piece or terminal 72, so that a circuit will be established through the wire 54, controller 82, contact-piece 72, wire 71, controller 69, contact-piece 64', post 64, wire 63, terminals or contact-arms 60 and 59, wire 58, contact-arms or terminals 57 and 56, wire 55, solenoid 45, and wire 54', the weight W of the beam B being on its support 2' and the actuator 86 bearing against the arm 85 of the circuit-controller 69 to hold the same against the contact-piece 64', as represented in Fig. 2. The circuit being thus established through the parts enumerated and, as shown by heavy lines in Fig. 5, the solenoid 45 is energized to hold its core 46 in the elevated position shown in Fig. 2 with the switch-lever S in contact with the upper contact 46' of the rheostat R, whereby the full strength of the current will pass through the motor M to operate the same, said motor being adapted to drive the conveyer C. When the conveyer is in motion, it will conduct a stream of large volume from the hopper H to the load-receiver G.

Figure 6:
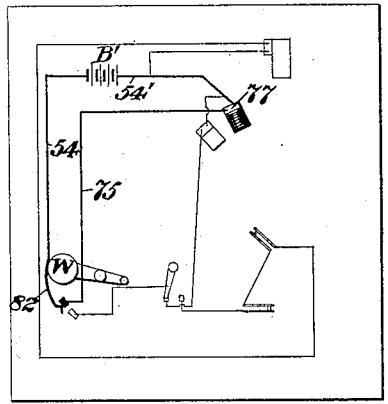
Figure 7:
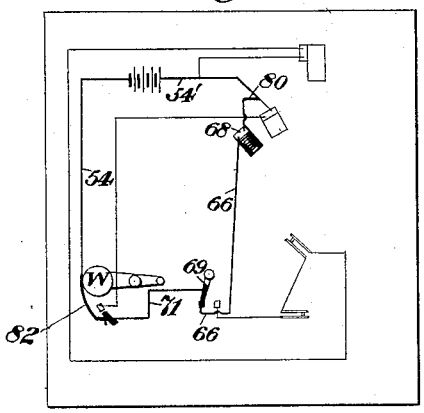
Figure 8:
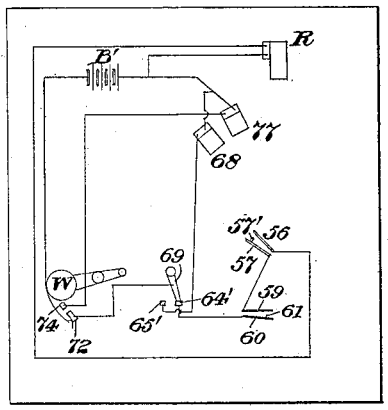

When a certain quantity of material has been received by the load-receiver, it, with the poising end of the beam B, will descend, and the counterpoised side of the beam on which the actuator 86 is situated being elevated said actuator will strike the arm 84 of the controller 69 at about the time the load-receiver G has reached the so-called "poising-line," so that the controller 69 will be shifted to the contact-piece 65', as shown in Fig. 3, thereby throwing the solenoid 45 out of circuit and permitting the core 46 to drop, whereby the switch-lever S will fall to shut off the circuit to the motor M, the conveyer C on the stoppage of the motor having a continued advancing movement due to its momentum, which is utilized to overload the load-receiver G and to carry it downward and the circuit-controller 82 upward into contact with the contact-piece 74, so that a circuit is established from the battery B', wire 54, controller 82, and terminal 74 through the wire 75, magnet 77, wire 79, and wire 54', as illustrated in Figs. 3 and 6, respectively, the circuit being indicated by the heavy lines in said last-mentioned figure, whereby the magnet 77 is energized to attract its armature 77' on the latch D for tripping the latter, whereby the closer will be lowered by the pressure of material in the load-receiver or until the lever 24 strikes the detent D'.

Figure 5:
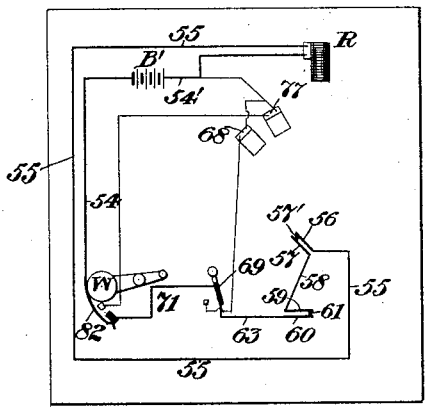

The closer L is shown partially open in Fig. 3 to permit the surplus or excess to pass from the load-receiver into the auxiliary or surplus-receiving chamber 8' of the duplex hopper H. As soon as the surplus material flows from the load-receiver, it, being lightened, will rise, the weight W falling, so that the controller 82 will pass off the contact-piece 74 and rest on the contact-piece 72, as shown in Fig. 4, this operation being completed when the surplus is removed. When the controller 82 strikes the contact-piece 72 on the downstroke of the weight W, a circuit is established through the wire 54, circuit-controller 82, contact 72, wire 71, controller 69, contact 65', post 65, wire 66, magnet 68, wire 80, wire 79, and wire 54', so that the magnet 68, which is in said circuit, is energized and will attract its armature 68' on the latch or detent D' to trip said latch and wholly release the closer L, so that it may be swung wide open, as indicated in Fig. 4, to discharge the load into the main chamber 8 of the discharge-hopper H', this action taking place before the controller 69 is shifted by the actuator 86 off from contact 65'. The load discharged from the receiver G then strikes the regulator E and depresses or lowers the same, thereby swinging the arm 62 out of contact with the contact-arm or terminal 60, so that the latter can spring away from its mate 59. As soon as the load is discharged into the main chamber 8 against the regulator E the weight W will drop to its normal position, as shown in Fig. 2, and when the closer and regulator E are shifted, as represented in Fig. 4, the circuit-controllers operative therewith will be in the positions represented in the diagrammatic view Fig. 8. When the closer L shuts, which occurs when the material has passed clear of its discharge edge, the guard-wall 10 thereof will force the contact arm or terminal 57 into engagement with the contact arm or terminal 56, and when the regulator E rises to its normal position the arm 62 will force the contact arms or terminals 59 and 60 into contact, thereby completing the circuit in which the solenoid 45 is located, as shown in Fig. 5, so that the core 46, and consequently the switch-lever S, will be elevated to carry the working end of the switch-lever onto the upper contact 46' of the rheostat, thereby to start the motor and feed-conveyer C.

When the beam B has nearly reached its normal position, the actuator 86 thereon will strike the arm 85 and swing the controller 69 off the contact-piece 65' and to the contact-piece 64', as indicated in Fig. 2, although it will be evident that by reason of the bifurcation of the controller the load can be poised without affecting the controller, as the actuator during the poising operation may move between the arms 84 and 85, respectively.

Figure 9:
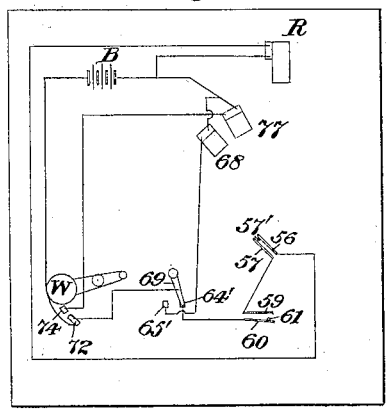

It will be evident that when the closer is open and the regulator E is down the solenoid-circuit will be broken, even though the other parts of the machine have returned to their primary positions, and consequently the solenoid cannot be energized to start the motor. When the closer shuts and the regulator E is down, it will be evident that the solenoid-circuit will still be incomplete, as will be the case when the regulator is shifted, as shown in Fig. 9.

The operation of the hereinbefore-described machine, briefly stated, is as follows: Fig. 2 shows the positions occupied by the several parts at the commencement of operation, the solenoid 45 being energized, as hereinbefore set forth, to maintain its core, and consequently the switch-lever S, in the proper positions thereof, whereby the motor M will be operated to drive the supply-conveyer C to thereby supply a stream of large volume to the load-receiver G, the circuit being represented by the heavy lines in Fig. 5. When a certain part of the material has been received, the load-receiver and the poising side of the beam B will descend, the counterpoised side of said beam being elevated to shift the controller 69 from out of contact with the terminal 64' and into contact with the terminal 65', this operation taking place when the load-receiver has received an overload, the solenoid 45 thereby being deënergized to stop the motor M. On the stoppage of the motor the conveyer C will feed into the load-receiver a comparatively small amount of material to bear the same farther downward and to further elevate the weight W, so that in the manner hereinbefore set forth the magnet 77 will be energized to trip the latch D, thereby to permit the closer L to drop from the position shown in Fig. 2 to that illustrated in Fig. 3, whereby the surplus will pass from the load-receiver. When the surplus is entirely removed, the magnet 68 will be energized in the manner hereinbefore set forth to trip the detent D', so that the closer can be swung to its wide-open position (shown in Fig. 4) to discharge the completed load into the main chamber 8 of the duplex discharge-hopper H'. When the closer opens, as specified, the terminal 57 springs away from the terminal 56. On the discharge of the load the material strikes or shifts the regulator E, so that the arm 62 is swung to the left and out of contact with the spring-terminal 60, whereby the latter can move away from its companion 59. When the closer shuts, which takes place when all of the material has passed from its discharge edge, the terminal 57 will be forced against the terminal 56 by the guard-wall 10, the weight W at this time having reached its primary position on the support 2'. When the regulator reaches its primary position, the arm 62 will force the terminals 60 and 59 into contact, thereby establishing the solenoid-circuit again to start the motor in operation.

Having described my invention, I claim—

1. The combination, with weighing mechanism embodying a load-receiver provided with a closer; a supply-conveyer; driving mechanism for said supply-conveyer, said driving mechanism including an electrical motor; an electric circuit embodying a device for governing the action of said motor; and a controller in said circuit and in position to be actuated by the closer, thereby to effect the operation of the device which governs the action of the motor.

2. The combination of weighing mechanism embodying a load-discharger; a supply-conveyer; an electric motor; an independent electrical circuit having a solenoid; a rheostat in the motor-circuit; a switch operative with the core of the solenoid; and a circuit-controller for the solenoid-circuit, operated by the load-discharger.

3. The combination of weighing mechanism including a load-receiver provided with a closer normally covering its discharge-outlet; a supply-conveyer; an electric motor for operating the supply-conveyer; an independent electric circuit having a solenoid; a rheostat in the motor-circuit; a switch-lever on the rheostat, pivoted to the core of the solenoid; and a circuit-controller for the solenoid-circuit, operative with the closer.

4. The combination of weighing mechanism; stream-supplying means; an electric circuit embodying a device for governing the action of the supply means; a regulator in position to be shifted by a load discharged from the weighing mechanism; and a circuit-controller operated by the regulator.

5. The combination of weighing mechanism embodying a load-discharger; stream-supplying means; an electric circuit comprehending a device for governing the action of the stream-supplying means; a regulator in position to be shifted by a load discharged from the weighing mechanism; and circuit-controllers operative, respectively, with the closer and the regulator.

6. The combination of weighing mechanism including a load-receiver provided with a closer; stream-supplying means; an electric circuit embodying a device for governing the action of the stream-supplying means; and terminals on the load-receiver, in circuit with said device and held in contact with each other by the closer.

7. The combination of weighing mechanism including a load-receiver provided with a closer; stream-supplying means; an electric circuit embodying a device for governing the action of the stream-supplying means; and spring-terminals on the load-receiver, in circuit with said device and held in contact with each other by the closer.

8. The combination of weighing mechanism including a load-receiver provided with a closer; stream-supplying means; an electric circuit embodying a device for governing the action of the stream-supplying means; terminals in circuit with said device and held in contact with each other by the closer; and an insulating-strip on the load-receiver, to which said terminals are secured.

9. The combination of weighing mechanism; a regulator supported below the weighing mechanism and shiftable by a load discharged therefrom; a regulator-shifting device; stream-supplying means; an electric circuit embodying a device for governing the action of the stream-supplying means; terminals in circuit with said device; and a member operative with the regulator for holding said terminals in contact with each other.

10. The combination of weighing mechanism; a regulator supported below the weighing mechanism and shiftable by a load discharged therefrom; a rock-shaft for carrying the regulator; stream-supplying means; an electric circuit embodying a device for governing the action of the stream-supplying means; terminals in circuit with said device; and an arm on said shaft, normally adapted to hold said terminals in contact with each other.

11. The combination, with weighing mechanism embodying a load-discharger, of overloading means; a plurality of latches adapted to hold the load-discharger; and means for successively tripping said latches, thereby permitting said load-discharger first to discharge the surplus or overload and finally the completed load.

12. The combination, with weighing mechanism embodying a load-discharger, of overloading means; a plurality of latches adapted to hold the load-discharger; and electrically-operated means for successively tripping the latches, thereby permitting said load-discharger first to discharge the surplus or overload and finally the completed load.

13. The combination of weighing mechanism including a load-receiver provided with a closer; a series of magnets mounted on the load-receiver; a series of latches adapted to hold the closer; and means for successively energizing the magnets.

14. The combination of weighing mechanism including a load-receiver provided with a closer; a plurality of gravity-latches mounted on the load-receiver; a series of magnets whose armatures are on the latches; and means for successively energizing the magnets.

15. The combination of weighing mechanism including a load-receiver provided with a closer; a series of gravity-latches pivoted on the load-receiver and having toes; stops on the load-receiver, against which said toes normally bear; a plurality of magnets secured to the load-receiver, the armatures of the magnets being secured to the latches; and means for successively energizing said magnets.

16. The combination of weighing mechanism including a load-receiver provided with a closer; a lever; a connection between the lever and the closer; a series of latches adapted to engage the lever; magnets whose armatures are secured to said latches; and means for successively energizing the magnets.

17. The combination of weighing mechanism including a load-receiver; a closer pivoted to the load-receiver; a counterweighted lever mounted on the load-receiver; a link connected, respectively, with the lever and closer; a series of latches adapted to engage said lever; a series of magnets whose armatures are secured to the latches; and means for successively energizing the magnets.

18. The combination of weighing mechanism including a load-receiver having a discharge-outlet; a closer connected with the load-receiver and so mounted as to be forced from its shut position to a partially-open position by the pressure of material in the load-receiver and then to be forced to its wide-open position in the same manner; a plurality of detents adapted successively to hold the closer in its several positions; and successively-effective means for operating the detents.

19. The combination of weighing mechanism including a load-receiver having a discharge-outlet; a closer pivoted to the load-receiver and so mounted as to be forced from its shut position to a partially-open position by the pressure of material in the load-receiver and then to be forced to its wide-open position in the same manner; a plurality of detents adapted successively to hold the closer in its several shifted positions; and successively-effective means for operating the detents.

20. The combination of weighing mechanism including a load-receiver having a discharge-outlet; a closer connected with the load-receiver and so mounted as to be forced from its shut position to a partially-open position by the pressure of material in the load-receiver, and then to be forced to its wide-open position in the same manner; a plurality of detents adapted successively to hold the closer in its several positions; successively-effective means for tripping the latches; and a duplex hopper the respective branches of which are positioned to receive the material removed from the load-receiver.

21. The combination of weighing mechanism including a load-receiver having a closer; stream-supplying means; an electrical device for controlling the stream-supplying means; a plurality of closer-holding latches; a series of latch-tripping magnets; and means for deënergizing the electrical controlling device and for subsequently and successively energizing the latch-tripping magnets.

22. The combination, with a load-receiver, of a scale-beam therefor; stream-supplying means; an electrical circuit embodying a device for governing the action of the stream-supplying means; an oscillatory circuit-controller mounted on the framework and bifurcated; and an actuator for the circuit-controller, on the beam.

23. The combination of a load-receiver having a closer; a supporting scale-beam; stream-supplying means; an electrical circuit embodying a device for governing the action of the stream-supplying means; a closer on the load-receiver; a plurality of closer-holding latches; closer-tripping magnets; an oscillatory circuit-controller on the framework; an actuator for said circuit-controller, on the scale-beam; contact-pieces; a circuit-controller connected with the scale-beam and adapted successively to coöperate with said contact-pieces; and electrical connections.

FRANCIS H. RICHARDS.

Witnesses:
F. N. CHASE,
ANDREW FERGUSON.